US012493048B2

(12) United States Patent
Kim et al.

(10) Patent No.: US 12,493,048 B2
(45) Date of Patent: Dec. 9, 2025

(54) ANTIBODIES BINDING SPECIFICALLY TO NT-proBNP AND USE THEREOF

(71) Applicant: BIONOTE, INC., Hwaseong-si (KR)

(72) Inventors: Jung Ho Kim, Hwaseong-si (KR); Se Jung Lee, Hwaseong-si (KR); Sun Nyeo Jeong, Hwaseong-si (KR); Soung Jin Ji, Hwaseong-si (KR); Ji Su Lee, Hwaseong-si (KR); Hye Rim Kim, Hwaseong-si (KR); Eun Young Sa, Hwaseong-si (KR); Bo Ram Lee, Hwaseong-si (KR); Jin Soo Kim, Hwaseong-si (KR); Hwa Young Im, Hwaseong-si (KR)

(73) Assignee: BIONOTE, INC., Hwaseong-si (KR)

( * ) Notice: Subject to any disclaimer, the term of this patent is extended or adjusted under 35 U.S.C. 154(b) by 635 days.

(21) Appl. No.: 17/955,111

(22) Filed: Sep. 28, 2022

(65) Prior Publication Data

US 2023/0288436 A1 Sep. 14, 2023

(30) Foreign Application Priority Data

Oct. 25, 2021 (KR) ........................ 10-2021-0143038
Mar. 14, 2022 (KR) ........................ 10-2022-0031497

(51) Int. Cl.
*C07K 16/26* (2006.01)
*G01N 33/74* (2006.01)

(52) U.S. Cl.
CPC ............ *G01N 33/74* (2013.01); *C07K 16/26* (2013.01); *C07K 2317/34* (2013.01); *C07K 2317/565* (2013.01); *G01N 2333/58* (2013.01); *G01N 2800/325* (2013.01)

(58) Field of Classification Search
None
See application file for complete search history.

(56) References Cited

U.S. PATENT DOCUMENTS

| | | | | |
|---|---|---|---|---|
| 9,605,068 | B2 * | 3/2017 | Woloszczuk ........... | G01N 33/68 |
| 2007/0161041 | A1 | 7/2007 | Woloszczuk et al. | |
| 2009/0163415 | A1 | 6/2009 | Katrukha et al. | |

FOREIGN PATENT DOCUMENTS

| | | | |
|---|---|---|---|
| WO | 2004046194 | A2 | 6/2004 |
| WO | 2006027374 | A1 | 3/2006 |
| WO | 2012019012 | A1 | 2/2012 |
| WO | 2014072500 | A1 | 5/2014 |

OTHER PUBLICATIONS

Canine NT-proBNP—A promising marker of heart failure in dogs, Jun. 1, 2019, Technotes, HyTest, 4 pages, retrieved from https://hytest.fi/sites/52cd5c487653512f63000004/content_entry52cd6295765351528d000020/5370bf60765351232200083e/files/Canine_NT-proBNP_TechNotes.pdf.
De Lima, G.V. et al., "N-terminal-pro brain natriuretic peptides in dogs and cats: A technical and clinical review," Veterinary World, vol. 10, Issue 9, pp. 1072-1082, Sep. 2017.
Search Report of the European Patent Office in related European Patent Appl. 22198462.8, dated Mar. 17, 2023, 8 pages.
Office Action of the Korea Patent Office in related Korean Appl. No. 10-2022-0031497, dated Jan. 17, 2025, 22 pages.
Seilhamer, J. J. et al., "Human and canine gene homologs of porcine brain natriuretic peptide", Biochemical and Biophysical Research Communications, Accession No. P16859, vol. 165 Issue No. 2, 1989, 2 pages.
Communication pursuant to Article 94(3) EPC of the European Patent Office in related European Patent Appl. No. 22198462.8, dated Jun. 25, 2025, 6 pages.
Foo, J. Y. Y. et al., "Circulating fragments of N-terminal pro-B-type natriuretic peptides in plasma of heart failure patients", Clin Chem, vol. 59 Issue No. 10, pp. 1523-1531, Oct. 2013.

* cited by examiner

*Primary Examiner* — Christine J Saoud
*Assistant Examiner* — Jon M Lockard
(74) *Attorney, Agent, or Firm* — Bochner PLLC; Andrew D. Bochner

(57) ABSTRACT

Provided are an antibody that binds specifically to N-terminal pro-B-type natriuretic peptide (NT-proBNP) and use thereof. An antibody or antigen-binding fragment thereof, which binds specifically to an epitope of NT-proBNP including the amino acid sequence of HXLGXXX (SEQ ID NO: 2), may detect NT-proBNP, which is a heart disease biomarker, and heart disease can also be effectively diagnosed by using the same.

8 Claims, 5 Drawing Sheets

Specification includes a Sequence Listing.

| C | 1 | 2 | 3 | 4 | 5 | 6 |
|---|---|---|---|---|---|---|
| 70 | 40 | 40 | 46 | 46 | 50 | — |

FIG. 4B

| < > | | 1 | 2 | 3 | 4 | 5 | 6 | 7 | 8 | Con |
|---|---|---|---|---|---|---|---|---|---|---|
| canine NT -pro BNP | 1 ug/ml | 0.0310 | 3.3790 | 0.0160 | 0.0200 | 0.3840 | 2.9310 | 3.2260 | 3.5500 | 3.6680 |
| | 0.1 ug/ml | 0.0060 | 2.4160 | 0.0040 | 0.0040 | 0.0420 | 0.8990 | 2.6960 | 2.2500 | 2.7240 |
| | 0.05 ug/ml | 0.0030 | 1.6600 | 0.0020 | 0.0030 | 0.0180 | 0.4590 | 2.2380 | 1.4990 | 1.9280 |
| | 0.025 ug/ml | 0.0030 | 0.9810 | 0.0010 | 0.0010 | 0.0110 | 0.2380 | 1.4130 | 0.8250 | 1.1620 |
| | 0.0125 ug/ml | 0.0030 | 0.5360 | 0.0030 | 0.0020 | 0.0080 | 0.1210 | 0.8280 | 0.4820 | 0.6420 |
| | 0.00625 ug/ml | 0.0020 | 0.2850 | 0.0010 | 0.0020 | 0.0050 | 0.0640 | 0.4610 | 0.2330 | 0.3310 |
| | 0.003125 ug/ml | 0.0010 | 0.1520 | 0.0000 | 0.0000 | 0.0020 | 0.0340 | 0.2330 | 0.1290 | 0.1800 |
| | 0.0015625 ug/ml | 0.0110 | 0.0840 | 0.0030 | 0.0010 | 0.0020 | 0.0300 | 0.1360 | 0.0710 | 0.0900 |
| REACTIVITY | | X | O | X | X | Δ | O | O | O | O |

ANTIBODIES BINDING SPECIFICALLY TO NT-proBNP AND USE THEREOF

CROSS-REFERENCE TO RELATED APPLICATIONS

This application is based on and claims priority under 35 USC § 119 to Korean Patent Application Nos. 10-2021-0143038, filed on Oct. 25, 2021, and 10-2022-0031497, filed on Mar. 14, 2022, Korean Intellectual Property Office, the disclosures of which are incorporated by reference herein in their entirety.

SEQUENCE LISTING

The instant application contains a Sequence Listing which has been submitted electronically in XML format and is hereby incorporated by reference in its entirety. Said XML copy, created on Sep. 2, 2025, is named PX068616US-amended.xml and is 33,794 bytes in size.

BACKGROUND

1. Field

The disclosure relates to an antibody that binds specifically to N-terminal pro-B-type natriuretic peptide (NT-proBNP) and use thereof.

2. Description of the Related Art

Heart disease in canines is treated with different treatment methods and has a varying prognosis depending on the cause, and heart failure with markedly reduced heart function is classified as a progressive disease that cannot be cured. In the case of a canine affected by heart disease, clinical symptoms such as coughing, exercise intolerance, and fainting appear, and when the heart disease progresses to a chronic disease, cardiac remodeling and a decrease in cardiac function may occur.

Among various types of biomarkers, N-terminal pro-B-type natriuretic peptide (NT pro-BNP) is the most basic biomarker for heart disease (WO 2014/072500). When the myocardium is under tension to stretch, the hormone BNP, which has a vasodilatory function, is released. That is, when the pressure affecting the myocardium is increased due to heart disease, the hormone is secreted from myocardial cells, and heart disease may be indirectly confirmed by measuring the precursor NT pro-BNP.

Under this background, the present inventors have completed an antibody capable of specifically binding to NT pro-BNP, and an antigen-binding fragment thereof, and when a biomarker is conveniently tested through a kit test containing the antibody, the results obtained based thereon may be clinically useful.

SUMMARY

Provided is an antibody or an antigen-binding fragment thereof, which binds specifically to an epitope of N-terminal pro-B-type natriuretic peptide (NT-proBNP) including the amino acid sequence of HXLGXXX (SEQ ID NO: 2).

Provided is a composition for detection of NT-proBNP, including an antibody or an antigen-binding fragment thereof, which binds specifically to an epitope of NT-proBNP including the amino acid sequence of HXLGXXX (SEQ ID NO: 2).

Provided is a kit for detection of NT-proBNP, including an antibody or an antigen-binding fragment thereof, which binds specifically to an epitope of NT-proBNP including the amino acid sequence of HXLGXXX (SEQ ID NO: 2).

Provided is a composition for diagnosing heart disease, including an antibody or an antigen-binding fragment thereof, which binds specifically to an epitope of NT-proBNP including the amino acid sequence of HXLGXXX (SEQ ID NO: 2).

Provided is a method of detecting NT-proBNP, the method including contacting, with a biological sample isolated from a subject, an antibody or an antigen-binding fragment thereof, which binds specifically to an epitope of NT-proBNP including the amino acid sequence of HXLGXXX (SEQ ID NO: 2), and detecting a complex formed by binding the biological sample with the antibody or antigen-binding fragment thereof.

Provided is an information providing method for diagnosing heart disease, including measuring the expression level of NT-proBNP in a biological sample isolated from a subject, wherein the measuring of the expression level of NT-proBNP is performed using an antibody or an antigen-binding fragment thereof, which binds specifically to an epitope of NT-proBNP including the amino acid sequence of HXLGXXX (SEQ ID NO: 2).

Provided is an antibody or an antigen-binding fragment thereof, which binds specifically to NT-proBNP, including a heavy chain variable region including heavy chain complementarity determining region 1 (HCDR1) comprising the amino acid sequence of SEQ ID NO: 4, heavy chain complementarity determining region 2 (HCDR2) comprising the amino acid sequence of SEQ ID NO: 5, and heavy chain complementarity determining region 3 (HCDR3) comprising the amino acid sequence of SEQ ID NO: 6, and a light chain variable region including light chain complementarity determining region 1 (LCDR1) comprising the amino acid sequence of SEQ ID NO: 7, light chain complementarity determining region 2 (LCDR2) comprising the amino acid sequence of SEQ ID NO: 8, and light chain complementarity determining region 3 (LCDR3) comprising the amino acid sequence of SEQ ID NO: 9.

Additional aspects will be set forth in part in the description which follows and, in part, will be apparent from the description, or may be learned by practice of the presented embodiments of the disclosure.

According to an aspect of the disclosure, provided are an antibody or an antigen-binding fragment thereof, which binds specifically to an epitope of N-terminal pro-B-type natriuretic peptide (NT-proBNP) including the amino acid sequence of HXLGXXX (SEQ ID NO: 2).

The term "N-terminal pro-B-type natriuretic peptide (NT-proBNP)" used herein is a protein derived from proBNP. The proBNP is a precursor protein of BNP and NT-proBNP, and is produced in cardiac muscle cells, and is split into BNP, which is an active hormone, and NT-proBNP, which is an inactive fragment, and then, BNP and NT-proBNP released into the blood. BNP (brain natriuretic peptide, B-type natriuretic peptide) is known to regulate blood volume and help the heart pump blood throughout the body. When muscle cells excessive stretch, the concentration of BNP or NT-proBNP in the blood is increased significantly. By measuring the concentration of BNP or NT-proBNP in the blood, the degree of stretching of the myocardium may be evaluated, which is proportional to the severity of the heart disease. In addition, compared to BNP, NT-proBNP is stable in blood and has a long half-life, and thus, is useful for use as a cardiac biomarker. Therefore, NT-proBNP may be utilized as a biomarker for the diagnosis of heart disease.

The NT-proBNP may be derived from a canine animal, and specifically may be a canine-derived NT-proBNP.

The term "epitope" used herein refers to a specific conformational molecular region that determines antigen specificity. The term "epitope" used herein may be used interchangeably with "antigenic determinant." The epitope may include the amino acid sequence of HXLGXXX (SEQ ID NO: 2). Specifically, the epitope may consist of the amino acid sequence of HXLGXXX (SEQ ID NO: 2).

SEQ ID NO: 2: H-$X_1$-L-G-$X_2$-$X_3$-$X_4$

Each of $X_1$ to $X_4$ of SEQ ID NO: 2 is an arbitrary amino acid, and may be one selected from 20 types of amino acids.

In an embodiment, $X_1$ may be P (proline), $X_2$ may be G (glycine), $X_3$ may be R (arginine), or $X_4$ may be S (serine). In an embodiment, SEQ ID NO: 2 may satisfy $X_1$=P, $X_2$=G $X_3$=R, and $X_4$=S, and may be represented by the amino acid sequence of SEQ ID NO: 3.

The epitope may include an amino acid sequence having at least 60%, for example, at least 70%, at least 80%, at least 90%, at least 95%, at least 99%, or 100% sequence identity to the sequence of SEQ ID NO: 3. In addition, the epitope may be an epitope having a sequence which differs from that of SEQ ID NO: 3 with respect to one or more amino acids, two or more amino acids, three or more amino acids, four or more amino acids, five or more amino acids, six or more amino acids, or seven or more amino acid residues in the sequence of SEQ ID NO: 3.

The antibody or antigen-binding fragment thereof may bind specifically to the epitope of NT-proBNP including the amino acid sequence of SEQ ID NO: 3, and binds specifically to an epitope consisting of the amino acid sequence of SEQ ID NO: 3.

The term "antibody" used herein refers to a specific immunoglobulin directed against an antigenic site. The antibody refers to a polypeptide or a combination of polypeptides that binds specifically to an epitope including the amino acid sequence of HXLGXXX (SEQ ID NO: 2). The form of the antibody includes a polyclonal antibody, a monoclonal antibody, or a recombinant antibody, for example, a ScFv fragment, a diabody, a single-chain antibody, and the like, and includes all immunoglobulin antibodies. The antibody may include not only the a complete structure with two full-length light chains and two full-length heavy chains, but also, although not having the structure of a complete-type of intact antibody having two light changes and two heavy chains, a functional fragment of an antibody molecule having an antigen-binding function by a specific antigen-binding site directed against an antigenic site, that is, a binding domain.

There are five types of the heavy chain, γ, δ, α, μ, and ε, and the heavy chain may determine the type of antibody. α and γ consist of 450 amino acids, and μ and ε consist of 550 amino acids. A heavy chain has two regions, that is, a variable region and a constant region.

The light chain has two types including A and K, and may consist of approximately 211 to 217 amino acids. There is only one chain in each of the human antibodies. The light chain consists of a constant region and a variable region which are continuous.

The term "antigen-binding fragment" used herein refers to a fragment of the entire immunoglobulin structure, and refers to a portion of a polypeptide including an antigen-binding portion. The fragment includes a functional fragment of an antibody molecule, which is not the intact antibody having two light chains and two heavy chains. For example, the antigen-binding fragment may be scFv, $(scFv)_2$, Fv, Fab, Fab', $F(ab')_2$, or a combination thereof. For example, the antigen-binding fragment may be $F(ab')_2$, Fab', Fab, Fv or scFv. Among the antigen-binding fragments, Fab has a structure having variable regions of light chain and heavy chain, constant region of light chain and first constant region ($C_{H1}$) of heavy chain, and has one antigen-binding site. Fab' differs from Fab with respect to the inclusion of a hinge region including one or more cysteine residues at the C-terminus of the heavy chain $C_{H1}$ domain. $F(ab')_2$ antibody is produced by forming a disulfide bond with a cysteine residue in the hinge region of Fab'. Fv is an antibody fragment having only a heavy chain variable region and a variable region of the light chain, and a recombinant technique for generating an Fv fragment is well known in the art. In two-chain Fv, the heavy chain variable region and the light chain variable region are linked to each other by a non-covalent bond. In single-chain Fv, the heavy chain variable region and the variable region of the single chain may be linked by a covalent bond through a peptide linker, or may be directly linked immediately at the C-terminus to form a dimer-like structure, as shown in a double chain Fv. The antigen-binding fragment may be obtained using a proteolytic enzyme (for example, Fab may be obtained by restriction digestion of the whole antibody with papain, and $F(ab')_2$ fragment may be obtained by digestion with pepsin). In addition, the antigen-binding fragment may be produced through genetic recombination technology.

The antibody or antigen-binding fragment thereof includes: a heavy chain variable region including heavy chain complementarity determining region 1 (HCDR1) comprising the amino acid sequence of SEQ ID NO: 4, heavy chain complementarity determining region 2 (HCDR2) comprising the amino acid sequence of SEQ ID NO: 5, and heavy chain complementarity determining region 3 (HCDR3) comprising the amino acid sequence of SEQ ID NO: 6; and a light chain variable region including light chain complementarity determining region 1 (LCDR1) comprising the amino acid sequence of SEQ ID NO: 7, light chain complementarity determining region 2 (LCDR2) comprising the amino acid sequence of SEQ ID NO: 8, and light chain complementarity determining region 3 (LCDR3) comprising the amino acid sequence of SEQ ID NO: 9.

Specially, the antibody or antigen-binding fragment thereof includes: a heavy chain variable region including heavy chain complementarity determining region 1 (HCDR1) consisting of the amino acid sequence of SEQ ID NO: 4, heavy chain complementarity determining region 2 (HCDR2) consisting of the amino acid sequence of SEQ ID NO: 5, and heavy chain complementarity determining region 3 (HCDR3) consisting of the amino acid sequence of SEQ ID NO: 6; and a light chain variable region including light chain complementarity determining region 1 (LCDR1) consisting of the amino acid sequence of SEQ ID NO: 7, light chain complementarity determining region 2 (LCDR2) consisting of the amino acid sequence of SEQ ID NO: 8, and light chain complementarity determining region 3 (LCDR3) consisting of the amino acid sequence of SEQ ID NO: 9.

The term "complementarity determining region (CDR)" used herein is a region that exists three each in the light and heavy chains of the variable region, and is a region with particularly high variability in the amino acid sequence in the variable region. Due to the high variability, antibodies specific to various antigens can be found. Three complementarity determining regions of the heavy chain are called HCDR1, HCDR2, and HCDR3 in sequence from the amino terminus to the carboxyl terminus, and three complementarity determining regions of the light chain are called LCDR1, LCDR2, and LCDR3 in sequence from the amino terminus to the carboxyl terminus. In one antibody, the six complementarity determining regions gather to form an antigen-binding site.

The antibody or antigen-binding fragment thereof may include an amino acid sequence having at least 70%, at least 80%, at least 90%, or at least 95% sequence homology to the amino acid sequence of each of SEQ ID NOs: 4 to 9. The “sequence homology” to the amino acid sequence may be confirmed by comparing the comparison region with two optimally aligned sequences.

The antibody that binds specifically to the epitope of NT-proBNP including the amino acid sequence of HXLGXXX (SEQ ID NO: 2) may be a monoclonal antibody, and is referred to herein as a first antibody.

The antibody or antigen-binding fragment thereof may include scFv fragment, a scFv-Fc fragment, an Fab fragment, an Fv fragment, a diabody, a chimeric antibody, a mouse antibody, a goat antibody, a sheep antibody, a marmot antibody, a rat antibody, a rabbit antibody, a or a humanized antibody.

The antibody may be produced in the hybridoma cells described in Examples.

The hybridoma cells may be prepared using a method known in the art. Specifically, the hybridoma cells may be prepared in the following method: an animal is immunized with NT-proBNP protein, and B cells, which are antibody-producing cells derived from the immunized animal, are fused with myeloma cells to prepare hybridoma cells, and then, from among them, a hybridoma cell producing a monoclonal antibody that binds specifically to recombinant NT-proBNP protein, is selected. The immunized animal may be not only the mouse used in Examples, but also animals such as goats, sheep, marmots, rats, or rabbits.

As a method for immunizing an animal to be immunized, a method known in the art may be used. For example, in the case of immunizing a mouse, at a time, 1 μg to 100 μg of the immunogen is emulsified with the same amount of physiological saline and/or an antigen adjuvant such as Freund's adjuvant, and the immunogen is inoculated 2-6 times every 2-5 weeks subcutaneously or intraperitoneally in the abdomen of the animal to be immunized. After the immunized animal is immunized, the spleen or lymph node is removed 3-5 days after the final immunization, and the B cells contained in these tissues are fused with myeloma cells in the presence of a fusion promoter according to a cell fusion method known in the art. The fusion promoter may be, for example, a material such as polyethylene glycol (PEG). The myeloma cells may be, for example, mouse-derived cells such as P3U1, NS-1, P3×63. Ag 8.653, or Sp2/0-Ag14, and rat-derived cells such as AG1 and AG2. In the cell fusion method known in the art, for example, B cells and myeloma cells are mixed in a ratio of 1:1-10:1, and PEG having a molecular weight of 1,000-6,000 is added thereto at a concentration of 10% to 80%, followed by incubation at 30° C. to 37° C. for 1 minute to 10 minutes. In addition, the hybridoma producing a monoclonal antibody that binds specifically to the NT-proBNP may be selected by culturing in a selective medium such as a HAT medium in which only the hybridoma may survive, and measuring the antibody activity in the hybridoma culture supernatant using a method such as ELISA. Finally, the hybridoma producing a monoclonal antibody binding specifically to NT-proBNP may be screened for by repeating cloning by, for example, limiting dilution with respect to a hybridoma producing a monoclonal antibody binding specifically to NT-proBNP. Meanwhile, the monoclonal antibody may be of IgG1, IgG2, IgG2a, IgG2b, IgG3, IgG4, IgM, IgE, IgA1, IgA5, or IgD type.

Another aspect provides a composition for detection of NT-proBNP, including an antibody or an antigen-binding fragment thereof, which binds specifically to an epitope of NT-proBNP including the amino acid sequence of HXLGXXX (SEQ ID NO: 2). The description as provided above is also applied to the composition.

The antibody or antigen-binding fragment thereof binds specifically to NT-proBNP, so that NT-proBNP in a sample may be detected or the expression level thereof may be measured.

The wording “measurement of expression level” refers to confirmation of the presence or expression, or measurement of level of expression of a specific protein (peptide). Specifically, the composition may be used to measure the expression level of the NT-proBNP protein.

Methods for measuring the expression level of the protein include western blotting, enzyme-linked immunosorbent assay (ELISA), radioimmunoassay (RIA), radial immunodiffusion, Ouchterlony immunodiffusion, rocket immunoelectrophoresis, immunohistochemical staining, immunoprecipitation assay, complement fixation assay, immunofluorescence, immunochromatography, fluorescenceactivated cell sorter (FACS) analysis, protein chip technology, or a biosensor. In detail, any method that uses an antibody or antigen-binding fragment thereof, which binds specifically to NT-proBNP, can be used as the method without limitations.

The composition for detecting NT-proBNP may be used for the detection of the antigen (NT-proBNP)-antibody complex, formed by binding of the antibody or antigen-binding fragment thereof to NT-proBNP, through immunofluorescence, immunochromatography, or an enzyme-linked immunosorbent assay (ELISA) method. For example, immunochromatographic method may be used.

The term “immunochromatography” refers to a method that may qualitatively and quantitatively analyze a trace amount of an analyte in a short time using an antigen-antibody reaction. This method is also known as a rapid test. For such immunochromatographic analysis, an assay strip including a reactant capable of reacting with an analyte to be detected and showing a change or a device-type assay device in which the assay strip is mounted in a plastic case is generally used. An assay strip of the related art includes a sample pad that accommodates a liquid sample, a conjugate pad containing a conjugate in which a label that generates a signal that may be detected with the naked eye or a sensor is conjugated to a ligand such as an antigen or antibody, a porous membrane pad on which a binding agent (antibody or antigen) binding specifically to the analyte and/or the conjugate in the sample is immobilized, and a moisture absorption pad finally receiving the liquid sample, wherein these functional pads are, in the order listed above, connected such that some of the pads overlap, and attached on a solid support and arranged continuously. As such, in the immunochromatographic analysis method using the assay strip, when a liquid sample is dropped onto the sample pad, the liquid sample moves through the conjugate pad and the porous membrane pad by capillary action, and is finally accommodated in the moisture absorption pad. At this time, the conjugate contained in the conjugate pad also moves along with the liquid sample, and when an analyte is present in the sample, the conjugate binds to the binding agent immobilized on the porous membrane pad through the analyte (usually, referred to as a “sandwich reaction”), or the conjugate and the analyte competitively bind to a binding agent (commonly referred to as a "competition reaction"), and thus, the presence of the analyte in the sample may be identified by any one method selected from enzyme-linked immunosorbent assay (ELISA), western blotting, immunofluorescence, immunochromatography, immunohistochemistry staining, flow cytometry flow cytometry, immunocytochemistry, radioimmunoassay (RIA), immunoprecipitation assay, immunodiffusion assay, complement fixation assay, and protein chip. In this regard, any method that is known in the art may be used without limitation.

The antibody (first antibody) may be bound or conjugated to a detection label, and when the antibody is not bound to a detection label, the formed antigen-antibody complex can be identified by treating with another antibody capable of capturing the antigen or antigen-antibody complex and having a detection label.

In addition, the formation of the antigen-antibody complex may be detected by a colormetric method, an electrochemical method, a fluorimetric method, a luminometry, a particle counting method, a visual assessment method, or a scintillation counting method.

The composition for detecting NT-proBNP may further include a second antibody or antigen-binding fragment thereof that binds specifically to NT-proBNP including the amino acid sequence of SEQ ID NO: 1. In an embodiment, an epitope for the second antibody or an antigen-binding fragment thereof may correspond to a region of NT-proBNP (SEQ ID NO: 1) from which the amino acid sequence of HXLGXXX (SEQ ID NO: 2) or SEQ ID NO: 3 is excluded. In an embodiment, the second antibody may bind specifically to an epitope region that does not overlap with that of the epitope region of first antibody.

The first antibody may be a capture antibody or a detector antibody. When the first antibody is a capture antibody, the second antibody may be a detector antibody. When the first antibody is a detector antibody, the second antibody may be a capture antibody. According to one embodiment, in the composition for detecting NT-proBNP, the first antibody may be a capture antibody, and the second antibody may be a detector antibody.

The detection label may include an enzyme, a fluorescent substance, a ligand, a luminescent substance, a microparticle, an enzymatic label, a magnetic material, or a radioactive isotope. Examples of enzymes used as detection labels are acetylcholinesterase, alkaline phosphatase, β-D-galactosidase, horseradish peroxidase, and B-latamase, examples of the fluorescent substance used as detection labels are fluorescein, $Eu^{3+}$, $Eu^{3+}$ chelates, cryptate, FITC, and RITC, examples of ligands used as detection labels are biotin derivatives, examples of luminescent materials are acridinium esters and isoluminol derivatives, examples of microparticles used as detection labels are colloidal gold and colored latex, and examples of radioactive isotopes used as detection labels are $^{57}Co$, $^{3}H$, $^{125}I$, and $^{125}I$-Bonton Hunter reagents. The detection label may allow the presence or absence of an analyte to be identified quantitatively or qualitatively using the naked eye or a sensor to determine the degree of color development. According to an embodiment, from among the detection labels, a fluorescent substance is conjugated to a ligand such as an antigen or an antibody to form a conjugate, and the conjugate is bound to the binding agent immobilized on the porous membrane pad through an analyte to form the complex, or the conjugate and the analyte competitively binds to the binding agent to form the complex, and when light is irradiated to the complex, the presence of the analyte can be confirmed according to the degree of color development by using a sensor.

Another aspect provides a kit for detection of NT-proBNP, including an antibody or antigen-binding fragment thereof, which binds specifically to an epitope of NT-proBNP including the amino acid sequence of HXLGXXX (SEQ ID NO: 2). The description as provided above is also applied to the kit.

The NT-proBNP detection kit may include the composition for the detection of NT-proBNP.

The NT-proBNP detection kit may be an immunochromatography kit. For example, the kit may include an assay strip in which a capture antibody is immobilized on a porous membrane pad and a detector antibody is immobilized on a conjugate pad.

For the immunological detection of NT-proBNP, the kit may further include, in addition to the substrate and an antibody bound to a detection label, an appropriate amount of a buffer, a chromogenic substrate, and the like. Also, any technology known in the art may be applied without limitation.

According to one embodiment, the composition for detecting NT-proBNP or a kit including the same may react/bind with NT-proBNP contained in a biological sample to cause the detection label to emit light or to develop color, and the degree of luminescence or color development of the detection label may be confirmed by applying additional reading devices. For example, the reading device may qualitatively or quantitatively analyze NT-proBNP in a biological sample based on the degree of luminescence or color development of the detection label.

Another aspect provides a composition for diagnosing heart disease, including an antibody or antigen-binding fragment thereof, which binds specifically to an epitope of NT-proBNP including the amino acid sequence of HXLGXXX (SEQ ID NO: 2). The description as provided above is also applied to the composition.

The composition for diagnosis may diagnose and/or predict a prognosis of a heart disease in a specific subject, specifically, a canine animal (Canidae) by detecting the NT-proBNP protein or measuring the expression level thereof.

The term "heart disease" used herein refers to a disease occurring in the heart. Specifically, heart disease in canines (canine animals) may be divided into congenital heart disease and acquired heart disease that occurs with age. In the case of congenital heart disease, patent ductus arteriosus and pulmonary valve stenosis occur most frequently, and other congenital heart diseases are subaortic stenosis, ventricular septal defect, and atrial septal defect. In addition, acquired heart disease may be caused by the failure of the valve to function due to aging, and the most common disease is myxomatous mitral valve degeneration.

The heart disease may be congenital heart disease or acquired heart disease, and specifically, may be one or more selected from patent ductus arteriosus, pulmonary valve stenosis, subaortic stenosis, ventricular septal defect, atrial septal defect, and myxomatous mitral valve degeneration.

The term "diagnosis" used herein refers to ascertaining the presence or characteristics of a pathological condition. For the purposes of the disclosure, diagnosis may refer to determining whether or not a heart disease occurs.

The term "prognosis" used herein refers to prediction of disease progression and recovery, and refers to a prospect or a preliminary evaluation. For the purposes of the disclosure, prognosis refers to determining the success of treatment, survival, recurrence, metastasis, drug reactivity, resistance, etc. in the subject after treatment of heart disease. That is, prognosis refers to the prediction of medical outcomes (e.g., long-term viability, disease-free survival rate, etc.), and includes a positive prognosis or a negative prognosis, wherein the negative prognosis includes progression or mortality of disease, such as recurrence, tumor growth, metastasis, drug resistance, etc., and a positive prognosis includes remission of disease, such as a disease-free state, and improvement or stabilization of disease, such as tumor regression.

The term "prediction" used herein refers to presuming a medical absurdity, and in the aspect of the purpose of the disclosure, and presuming the course of the disease (progression, amelioration, recurrence, drug resistance) of a subject diagnosed with heart disease is predicted in advance.

The composition for diagnosis may further include a second antibody or antigen-binding fragment thereof, which binds specifically to NT-proBNP including the amino acid sequence of SEQ ID NO: 1 and in an embodiment, an epitope for the second antibody or an antigen-binding fragment thereof may correspond to a region of NT-proBNP (SEQ ID NO: 1) from which the amino acid sequence of HXLGXXX (SEQ ID NO: 2) or SEQ ID NO: 3 is excluded.

The diagnostic composition may be used to diagnose whether or not the subject has heart disease by detecting NT-proBNP, which is a heart disease biomarker in canines, using an antibody that binds specifically to NT-proBNP or an antigen-binding fragment thereof.

Another aspect provides a method of detecting NT-proBNP, the method including: contacting an antibody (first antibody) or antigen-binding fragment thereof, which binds specifically to an epitope of NT-proBNP including the amino acid sequence of HXLGXXX (SEQ ID NO: 2), with a biological sample isolated from a subject; and detecting a complex formed by binding the biological sample with the antibody or antigen-binding fragment thereof. The description as provided above is also applied to the method.

The term "subject" used herein refers to any organism that develops or is likely to develop a heart disease, specifically, an organism whose expression level of proBNP, NT-proBNP and/or BNP is changed by the onset of heart disease. Examples of the subject are: mammals, including canines, cats, mice, rats, monkeys, cattle, pigs, mini-pigs, livestock, humans, and the like; and farmed fish. In an embodiment, the subject may be canines.

The canine animal may be largely categorized as a tribe canini and tribe vulpini, and may include canines, wolves, jackals, foxes, scavengers, raccoons, coyotes, and the like. In an embodiment, the canine animal may be canines or wolves. The canine is known to have been domesticated from wild wolves, and accordingly, wolves and canines have the same number of chromosomes, and the gestation period and sex hormone changes thereof are similar to each other. In the present specification, the term 'canine animal' is simply shortened to 'canine' and the canine animal and the canine are used interchangeably.

The term "biological sample" refers to a material derived from the subject, and may include cells, organs, cell lysates, whole blood, blood, serum, plasma, lymph, extracellular fluid, body fluid, urine, feces, tissues, bone marrow, saliva, sputum, cerebrospinal fluid, or a combination thereof. In an embodiment, the biological sample may be blood, but is not limited thereto. In addition, a gene and/or a protein sample may be obtained from these samples, and the genetic sample may include a nucleic acid, for example, DNA, mRNA, or cDNA synthesized from mRNA. The gene and/or protein sample may be any sample from which the level of the expression of a specific gene/protein can be confirmed therefrom.

The contacting may further include contacting a biological sample isolated from a subject with a second antibody or antigen-binding fragment thereof, which binds specifically to NT-proBNP including the amino acid sequence of SEQ ID NO: 1. The epitope for the second antibody or antigen-binding fragment thereof may correspond to a region of NT-proBNP (SEQ ID NO: 1) from which the amino acid sequence of HXLGXXX (SEQ ID NO: 2) or SEQ ID NO: 3 is excluded.

The first antibody and the second antibody may be individually, sequentially or simultaneously brought in contact with the separated biological sample, but is not limited thereto.

The contacting may include contacting the composition for detecting NT-proBNP with a biological sample isolated from a subject.

The detecting of the method may be performed by at least one method selected from western blotting, enzyme-linked immunosorbent assay (ELISA), radioimmunoassay (RIA), radial immunodiffusion, Ouchterlony immunodiffusion, rocket immunoeletrophoresis, immunohistochemical staining, immunoprecipitation assay, complement fixation assay, immunofluorescence, immunochromatography, fluorescenceactivated cell sorter (FACS) analysis, protein chip technology, or a biosensor. In detail, any method that uses an antibody or antigen-binding fragment thereof binding specifically to NT-proBNP, can be used as the method without limitations.

The method for detecting NT-proBNP may quantitatively or qualitatively analyze NT-proBNP in a biological sample.

Another aspect provides an information providing method for diagnosing heart disease, including measuring the expression level of NT-proBNP in a biological sample isolated from a subject, wherein the measuring of the expression level of NT-proBNP is performed using an antibody or antigen-binding fragment thereof, which binds specifically to an epitope of NT-proBNP including the amino acid sequence of HXLGXXX (SEQ ID NO: 2). The description as provided above is also applied to the method.

The method may further include: measuring the expression level of NT-proBNP in a biological sample isolated from a control; and comparing the expression level of the subject and the expression level of the control.

The term "control" used herein may refer to a general subject who has not developed a heart disease, a non-heart disease patient group, a non-patient group, and the like.

When the expression level of the subject is higher than that of the control, the method may further include determining the subject as having a heart disease or estimating the risk of developing a heart disease to be at a high level.

The method may quantitatively or qualitatively analyze NT-proBNP contained in a biological sample obtained from a subject.

According to an embodiment, when the concentration of NT-proBNP in the biological sample is less than 900 pmol/L, the subject may be determined as being normal; when the concentration is 900 pmol/L or more and 1,800 pmol/L or less, the subject may be suspected to have the onset of heart disease; and when the concentration is greater than 1,800 pmol/L, the subject may be determined to have developed heart disease.

Another aspect provides an antibody that binds specifically to NT-proBNP or an antigen-binding fragment thereof, including: a heavy chain variable region including heavy chain complementarity determining region 1 (HCDR1) comprising the amino acid sequence of SEQ ID NO: 4, heavy chain complementarity determining region 2 (HCDR2) comprising the amino acid sequence of SEQ ID NO: 5, and heavy chain complementarity determining region 3 (HCDR3) comprising the amino acid sequence of SEQ ID NO: 6; and a light chain variable region including light chain complementarity determining region 1 (LCDR1) comprising the amino acid sequence of SEQ ID NO: 7, light chain complementarity determining region 2 (LCDR2) comprising the amino acid sequence of SEQ ID NO: 8, and light chain complementarity determining region 3 (LCDR3) comprising the amino acid sequence of SEQ ID NO: 9. The description as provided above is also applied to the antibody or the antigen-binding fragment thereof.

Specially, the antibody or antigen-binding fragment thereof includes: a heavy chain variable region including heavy chain complementarity determining region 1 (HCDR1) consisting of the amino acid sequence of SEQ ID NO: 4, heavy chain complementarity determining region 2 (HCDR2) consisting of the amino acid sequence of SEQ ID NO: 5, and heavy chain complementarity determining region 3 (HCDR3) consisting of the amino acid sequence of SEQ ID NO: 6; and a light chain variable region including light chain complementarity determining region 1 (LCDR1) consisting of the amino acid sequence of SEQ ID NO: 7, light chain complementarity determining region 2 (LCDR2) consisting of the amino acid sequence of SEQ ID NO: 8, and light chain complementarity determining region 3 (LCDR3) consisting of the amino acid sequence of SEQ ID NO: 9.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 4A and 4B show an image showing the results of quaternary epitope mapping of an NT-proBNP capture antibody.

DETAILED DESCRIPTION

Figure 1:
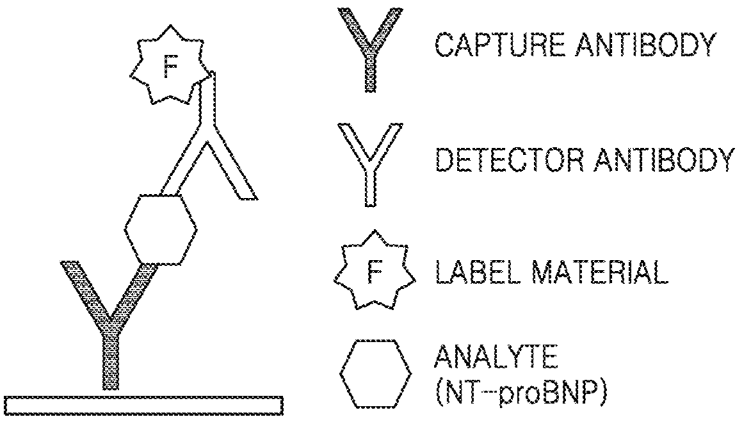
FIG. 1 is a diagram schematically illustrating a method of manufacturing an NT-proBNP capture antibody and an NT-proBNP detector antibody and a method for detecting NT-proBNP by using the same.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, the disclosure will be described in more detail through examples. However, these examples are for illustrative purposes only, and the scope of the disclosure is not limited to these examples.

Example 1: Preparation of NT-proBNP Antibody-Preparation of Capture Antibody and Detector Antibody The following experiment was performed to prepare a capture antibody and a detector antibody for detecting NT-proBNP derived from canines.

Specifically, the immunogen, which is NT-proBNP, and an antigen adjuvant were mixed to immunize a female 6-week-old mouse, and the spleen of the animal was isolated and the cells were separated therefrom. The antibody-producing splenocytes were fused with myeloma cells to prepare hybridomas. Then, from the hybridomas, a hybridoma that produces a monoclonal antibody that binds specifically to NT-proBNP was screened for. As the immunized animal, not only the mouse used in Examples, but also animals such as goats, sheep, marmots, rats or rabbits may be used, and monoclonal antibodies or polyclonal antibodies may be used.

Example 2: Epitope Mapping of NT-proBNP Capture Antibody

In order to confirm the NT-proBNP epitope region of the NT-proBNP capture antibody prepared in Example 1, the following experiment was performed.

2.1: Primary Epitope Mapping

For primary epitope mapping of the capture antibody, the entire sequence of NT-proBNP was divided into 15 regions to prepare a primary recombinant antigen (named CNT1 to CNT15), and a strip spot test was performed to identify whether the capture antibody and the recombinant antigen were bound to each other (Table 1).

TABLE 1

| Item | | Name | Characteristic | Sequence | Reactivity with Capture antibody Strip spot test |
|---|---|---|---|---|---|
| Positive control | | Control | Recombinant antigen | (Full length) HPLG to SPK | O |
| Test | 1 | CNT1 | Peptide | HPLGGRSPASE ASEA | O |

TABLE 1-continued

| Item | Name | Character-istic | Sequence | Reactivity with Capture antibody Strip spot test |
|---|---|---|---|---|
| 2 | CNT2 | Peptide | RSPASEASEASE ASG | X |
| 3 | CNT3 | Peptide | EASEASEASGLW AVQ | X |
| 4 | CNT4 | Peptide | SEASGLWAVQEL LGR | X |
| 5 | CNT5 | Peptide | LWAVQELLGRLK DAV | X |
| 6 | CNT6 | Peptide | ELLGRLKDAVSE LQA | X |
| 7 | CNT7 | Peptide | LKDAVSELQAEQ LAL | X |
| 8 | CNT8 | Peptide | SELQAEQLALEP LHR | X |
| 9 | CNT9 | Peptide | EQLALEPLHRSH SPA | X |
| 10 | CNT10 | Peptide | EPLHRSHSPAEA PEA | X |
| 11 | CNT11 | Peptide | SHSPAEAPEAGG TPR | X |
| 12 | CNT12 | Peptide | EAPEAGGTPRGV LAP | X |
| 13 | CNT13 | Peptide | GGTPRGVLAPHD SVL | X |
| 14 | CNT14 | Peptide | GVLAPHDSVLQA LRR | X |
| 15 | CNT15 | Peptide | HDSVLQALLRLR SPK | X |

In the strip spot test, the recombinant antigen was spotted on a nitrocellulose membrane, and then, the resultant structure was reacted by mixing a capture antibody. to which gold nanoparticles were conjugated, with a buffer, and binding can be confirmed by development of color.

Figure 2:
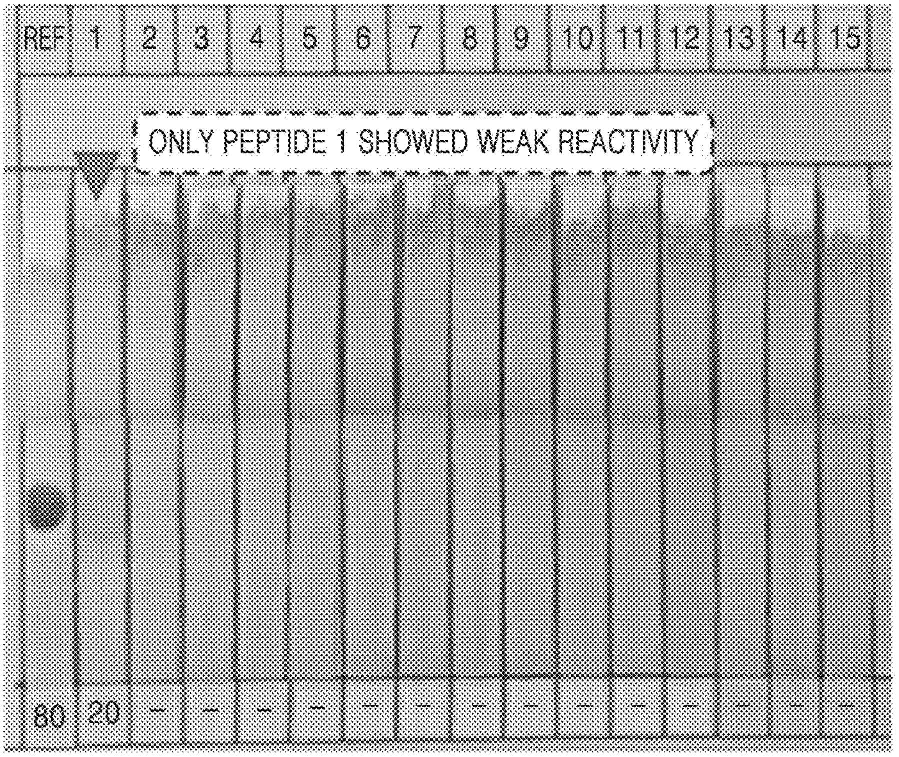
FIG. 2 shows an image showing the results of primary epitope mapping of an NT-proBNP capture antibody.

As a result of the analysis, a weak reactivity occurred only with respect to the CNT1 recombinant antigen, indicating that an epitope region exists in CNT1 (FIG. 2).

2.2: Secondary Epitope Mapping

For secondary epitope mapping of the capture antibody, the C-terminal amino acid of the CNT1 recombinant antigen, which was confirmed to have reactivity in Example 2.1, was cleaved to prepare secondary recombinant antigens (named CNT1-1 to CNT1-5), and a strip spot test was performed to confirm whether the capture antibody and the recombinant antigen were bound to each other (Table 2).

TABLE 2

| Item | | Name | Character-istic | Sequence | Reactivity with Capture antibody Strip spot test |
|---|---|---|---|---|---|
| Positive control | | Control | Recombinant antigen | (Full length) HPLG to SPK | O |
| Test | 1 | CNT1 | Peptide | HPLGGRSPASEASEA | O |
| | 2 | CNT1-1 | Peptide | HPLGGRSPASEAS | O |
| | 3 | CNT1-2 | Peptide | HPLGGRSPASE | O |
| | 4 | CNT1-3 | Peptide | HPLGGRSPA | O |
| | 5 | CNT1-4 | Peptide | HPLGGRS | O |
| | 6 | CNT1-5 | Peptide | HPLG | X |

Figure 3:
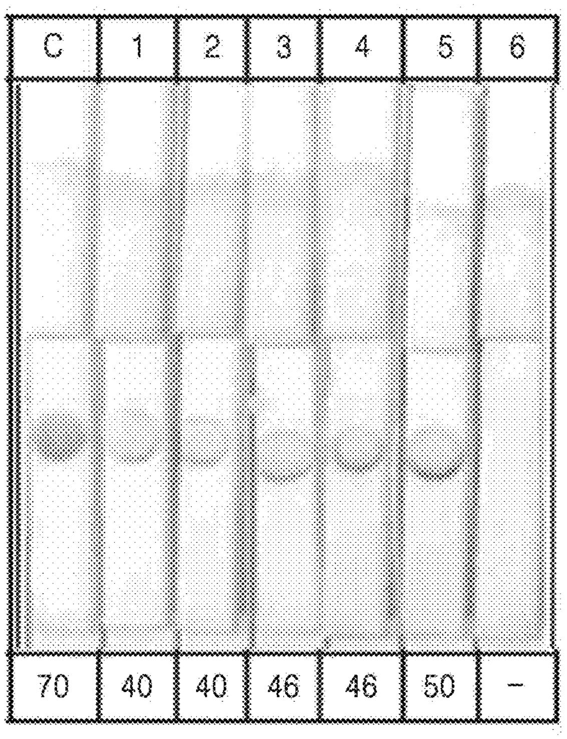
FIG. 3 shows an image showing the results of secondary epitope mapping of an NT-proBNP capture antibody.

As a result of the analysis, it was confirmed that there was the reactivity to CNT1-1 to CNT1-4 recombinant antigen, but not to CNT1-5 recombinant antigen. Based on this result, it can be seen that the amino acid sequence of CNT1-4 is an epitope region of the NT-proBNP capture antibody (FIG. 3).

2.3: Tertiary Epitope Mapping

In order to confirm that the amino acid sequence of CNT1-4 confirmed in the secondary epitope mapping is the minimum unit of the NT-proBNP capture antibody epitope, a recombinant antigen in which the C-terminal amino acid of the CNT1-4 recombinant antigen was additionally cleaved, was additionally prepared. (Named as CNT1-6 and CNT1-7), and a strip spot test was performed to confirm whether the capture antibody and the recombinant antigen were bound to each other (Table 3).

TABLE 3

| Item | | Name | Characteristic | Sequence | Reactivity with Capture antibody Strip spot test |
|---|---|---|---|---|---|
| Positive control | | Control | Recombinant antigen | (Full length) HPLG to SPK | O |
| Test | 1 | CNT1 | Peptide | HPLGGRSPASEASEA | O |
| | 2 | CNT1-1 | Peptide | HPLGGRSPASEAS | O |
| | 3 | CNT1-2 | Peptide | HPLGGRSPASE | O |
| | 4 | CNT1-3 | Peptide | HPLGGRSPA | O |
| | 5 | CNT1-4 | Peptide | HPLGGRS | O |
| | 6 | CNT1-5 | Peptide | HPLG | X |
| | 7 | CNT1-6 | Peptide | HPLGGR | X |
| | 8 | CNT1-7 | Peptide | HPLGG | X |

As a result of the analysis, it was confirmed that there was the reactivity to the CNT1-4 recombinant antigen, but not to the recombinant antigen in which the C-terminal amino acid was additionally cleaved. Based on this, it may be seen that the amino acid sequence of CNT1-4 is the minimum reactivity epitope region of the NT-proBNP capture antibody.

2.4: Quaternary Epitope Mapping

To identify a key amino acid portion that plays a key role in the minimum unit epitope region of the NT-proBNP capture antibody identified in the tertiary epitope mapping, additional epitope mapping was performed through an alanine scanning mutagenesis test.

First, the full-length canine NT-proBNP protein was expressed in the *E. coli* expression system, and the 1$^{st}$ to 8$^{th}$ amino acids were substituted with an alanine expression codon (GCT), respectively, and cloned to prepare an NT-proBNP recombinant antigen (Table 4).

TABLE 4

| Canine NT-proBNP Origin. seq. | 1 H | 2 P | 3 L | 4 G | 5 G | 6 R | 7 S | 8 P | up to 85 (aa) . . . |
|---|---|---|---|---|---|---|---|---|---|
| 1 | A | P | L | G | G | R | S | P | . . . |
| 2 | H | A | L | G | G | R | S | P | . . . |
| 3 | H | P | A | G | G | R | S | P | . . . |
| 4 | H | P | L | A | G | R | S | P | . . . |
| 5 | H | P | L | G | A | R | S | P | . . . |

TABLE 4-continued

| Canine NT-proBNP Origin. seq. | 1 H | 2 P | 3 L | 4 G | 5 G | 6 R | 7 S | 8 P | up to 85 (aa) . . . |
|---|---|---|---|---|---|---|---|---|---|
| 6 | H | P | L | G | G | A | S | P | . . . |
| 7 | H | P | L | G | G | R | A | P | . . . |
| 8 | H | P | L | G | G | R | S | A | . . . |

Figure 4A:
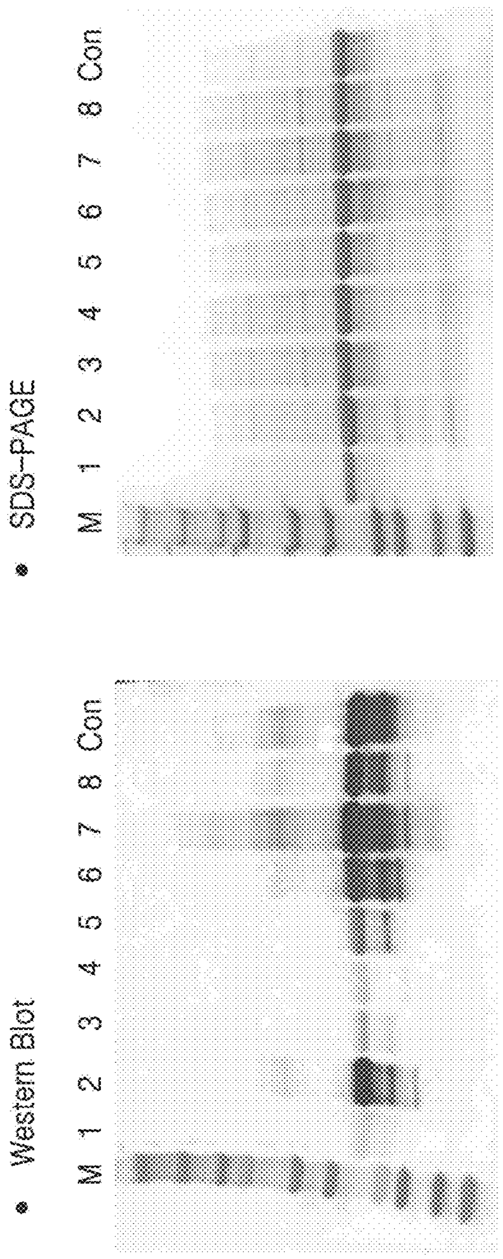

Next, western blotting was performed to confirm the reactivity of the NT-proBNP capture antibody of the disclosure to the recombinant antigen. Specifically, the recombinant antigen (3 ug) was subjected to SDS-PAGE electrophoresis and blotted on a membrane, and then, reacted with the HRP-conjugated NT-proBNP capture antibody (10 μg/ml) and then, the substrate (CN/DAB) reactivity was identified. The results showed that when the 1$^{st}$, 3$^{rd}$ and 4$^{th}$ amino acid sites were substituted with A, the band in western blotting was disappeared or weakened (where the band had been clearly identified in SDS-PAGE) (FIG. 4A).

Next, ELISA was performed to confirm the reactivity of the NT-proBNP capture antibody of the disclosure to the recombinant antigen. Specifically, the recombinant antigen (6 μg/ml) was coated on a plate, and the HRP-conjugated NT-proBNP capture antibody was treated at various concentrations, and a substrate (TMB) was added thereto to cause a reaction. Then, the absorbance of thereof was measured to identify the reactivity. As a result, like the results obtained from the western blotting, it was confirmed that when the 1$^{st}$, 3$^{rd}$ and 4$^{th}$ amino acid sites were substituted with A, the reactivity was disappeared (FIG. 4B).

Accordingly, it can be seen that the 1$^{st}$, 3$^{rd}$ and 4$^{th}$ amino acids of the amino acid sequence of CNT1-4, which is the minimum unit epitope region of the NT-proBNP capture antibody of the disclosure, are key epitopes.

Example 3: CDR Sequence Analysis of NT-proBNP Capture Antibody

The CDR sequence of the NT-proBNP capture antibody of the disclosure, for which the epitope was identified in Example 2, was analyzed, and the sequence information of the CDR regions in the light chain variable region and the heavy chain variable region is shown in Table 5.

TABLE 5

| CDR regions | | Amino acid sequence (5'→3') | SEQ ID NO: |
|---|---|---|---|
| Heavy chain | CDR1 | GFSLSTSGV | 4 |
| | CDR2 | WWDDD | 5 |
| | CDR3 | MDDYNYAFDY | 6 |
| Light chain | CDR1 | KSSQSLLYSNGKTYLN | 7 |
| | CDR2 | LVSKLDS | 8 |
| | CDR3 | VQGTHFPLT | 9 |

Example 4: Evaluation of Clinical Performance of Diagnostic Kits Containing NT-proBNP Capture Antibody The following experiment was performed to evaluate the diagnostic effect of the kit for diagnosis of the canine heart disease including the NT-proBNP capture antibody of the disclosure, for which epitope was identified in Example 2 and of which sequence was analyzed in Example 3.

4.1: Selection of Subjects for Clinical Evaluation and Collection of Samples

From Jul. 1, 2020 to Dec. 31, 2020, the subjects for clinical evaluation were selected from among the canines who visited veterinary hospitals of grade 2 or higher. Normal canines were selected from healthy subjects that do not have symptoms related to heart disease. Subjects diagnosed with heart disease through echocardiography were used as canines affected by heart disease (Subjects belonging to the group of canines affected by heart disease satisfied the NT pro-BNP range (250 pmol/L to 10,000 pmol/L)). The heart disease included myxomatous mitral valve degeneration.

Serum of blood samples collected from subjects for clinical evaluation was isolated and immediately tested. When the immediate test could not be performed, the serum was stored at −80° C. until the test.

4.2: Analysis of Characteristics of Subjects for Clinical Evaluation

The information about the subjects (n=100) for clinical evaluation, on which the NT pro-BNP test using the kit for diagnosis of canine animal heart disease containing the NT-proBNP capture antibody of the disclosure was performed, is as follows.

First, the heart disease group consisted of 50 subjects which all had myxomatous mitral valve degeneration, and the normal group consisted of 50 subjects which all were healthy subjects with no symptoms related to heart disease (Table 6).

TABLE 6

| Group | Name of disease | Number of subjects (heads) | Ratio (%) |
|---|---|---|---|
| Heart disease (n = 50) | Myxomatous mitral valve degeneration | 50 | 50 |
| Normal (n = 50) | None | 50 | 50 |
| Total number of subjects | | 100 | 100 |

As a result of echocardiography to evaluate the M-mode myocardial wall thickness and myocardial contractile function in the right parasternal short-axis papillary muscle view, in the case of the heart disease group, the fractional shortening (FS) value and the ejection fraction (EF) value were 52.90±9.02%, and 84.48±7.73%, respectively, and in the case of the normal group, the fractional shortening (FS) value and the ejection fraction (EF) value were 46.01±9.06%, and 78.43±9.57%, respectively (Table 7). For both items, the heart disease group showed significantly higher values than the normal group ($p<0.001$).

TABLE 7

| Values | Heart disease (n = 50, average ± standard deviation) | Normal (n = 50, average ± standard deviation) | Reference range | P value |
|---|---|---|---|---|
| IVSd (cm) | 0.69 ± 0.18 | 0.68 ± 0.19 | 0.43-0.87 | 0.841 |
| LVIDd (cm) | 2.41 ± 0.56 | 2.39 ± 0.68 | 2.04-2.97 | 0.843 |
| LVPWd (cm) | 0.65 ± 0.21 | 0.65 ± 0.20 | 0.42-0.87 | 0.964 |
| IVSs (cm) | 1.08 ± 0.22 | 1.00 ± 0.25 | 0.63-1.16 | 0.076 |
| LVIDs (cm) | 1.15 ± 0.39 | 1.32 ± 0.50 | 1.18-2.09 | 0.061 |
| LVPWs (cm) | 1.22 ± 1.04 | 1.02 ± 0.27 | 0.69-1.24 | 0.180 |
| FS (%) | 52.90 ± 9.02 | 46.01 ± 9.06 | 33.4-45.9 | <0.001** |
| EF (%) | 84.48 ± 7.73 | 78.43 ± 9.57 | 60.1-72.9 | <0.001** |

IVSd: diastolic interventricular septum, LVIDd: diastolic left ventricular internal diameter, LVPWd: diastolic left ventricular posterior wall thickness, IVSs: systolic interventricular septum, LVIDs: systolic left ventricular internal diameter, LVPWs: systolic left ventricular posterior wall thickness, FS: fractional shortening, EF: ejection fraction.

**P < 0.01

4.3: Analysis of NT Pro-BNP Test Results of Subjects for Clinical Evaluation

As a result of performing the NT pro-BNP test on the subject for clinical evaluation using the kit for diagnosis of canine heart disease including the NT-proBNP capture antibody of the disclosure, the heart disease group showed the value of 1815.14±1680.63 pmol/L and the normal group showed the value of 479.64±48.00 pmol/L. Accordingly, it can be seen that the heart disease group had a significantly greater value than the normal group (Table 8).

TABLE 8

| Group | Heart disease (n = 50, average ± standard deviation) | Normal (n = 50, average ± standard deviation) | P value |
|---|---|---|---|
| BIONOTE (pmol/L) | 1815.14 ± 1680.63 | 479.64 ± 48.00 | <0.001** |

Next, canines of the canine group affected by heart disease were classified according to the severity of heart disease using, in the case of myxomatous mitral valve degeneration, the ACVIM stage. The results obtained by comparing NT pro-BNP values according to the ACVIM stage showed that ACVIM Stage Cc showed the highest value of 2175.92±1733.52 pmol/L, followed by stage D (2035.23±1547.24 pmol/L), stage B2 (899.93±1341.01 pmol/L), and stage B1 (556.87±531.51 pmol/L)/L) and normal (479.64±48.00 pmol/L), and, that is, the normal group showed the lowest level (Table 9).

TABLE 9

| Group | Normal (n = 50, average ± standard deviation) | ACVIM B1 (n = 3, average ± standard deviation) | ACVIM B2 (n = 10, average ± standard deviation) | ACVIM Cc (n = 34, average ± standard deviation) | ACVIM D (n = 3, average ± standard deviation) | P value |
|---|---|---|---|---|---|---|
| BIONOTE (pmol/L) | 479.64 ± 48.00[a] | 556.87 ± 531.51[ab] | 899.93 ± 1341.01[ab] | 2175.92 ± 1733.52[b] | 2035.23 ± 1547.24[ab] | <0.001 |

[Different alphabets mean that there is a significant difference between groups ($p < 0.05$)]

Next, the positive predictive value, the negative predictive value, and the accuracy of the kit for diagnosis of canine heart disease containing the NT-proBNP capture antibody of the disclosure were analyzed. The results shows that the positive predictive value was 82%, the negative predictive value was 67%, and the accuracy was 72%. Accordingly, it was confirmed that the onset of heart disease was accurately diagnosed (Table 10).

TABLE 10

| | | Disease diagnosis | | | | |
|---|---|---|---|---|---|---|
| | | Heart disease | Normal | Total value | Predictive value (%) | |
| BIONOTE | Abnormal range (≥900 pmol/L) | 28 | 6 | 34 | Positive predictive value | 82 |
| | Normal range (<900 pmol/L) | 22 | 44 | 66 | Negative predictive value | 67 |
| | Total | 50 | 50 | 100 | Accuracy | 72 |

Based on these results, it can be seen that the kit for diagnosis of canine heart disease including the NT-proBNP capture antibody of the disclosure can effectively detect NT-proBNP in canines with heart disease, and based on the detection result, heart disease can be accurately diagnosed.

The description of the disclosure described above is provided only for illustration, and those of ordinary skill in the art to which the disclosure pertains may understand that the embodiments presented herein may be easily modified into other specific forms without changing the technical spirit or essential features of the disclosure. Therefore, it should be understood that the embodiments described above are illustrative in all respects and not restrictive.

An antibody or antigen-binding fragment thereof, which binds specifically to an epitope of NT-proBNP including the amino acid sequence of HXLGXXX (SEQ ID NO: 2) according to an aspect may detect NT-proBNP, a cardiac disease biomarker, and the heart disease can also be effectively diagnosed by using the same.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. An antibody or antigen-binding fragment thereof, which specifically binds to an epitope of N-terminal pro-B-type natriuretic peptide (NT-proBNP) comprising the amino acid sequence of HXLGXXX, wherein the antibody or antigen-binding fragment thereof comprises:

a heavy chain variable region comprising heavy chain complementarity determining region 1 (HCDR1) comprising the amino acid sequence of SEQ ID NO: 4, heavy chain complementarity determining region 2 (HCDR2) comprising the amino acid sequence of SEQ ID NO: 5, and heavy chain complementarity determining region 3 (HCDR3) comprising the amino acid sequence of SEQ ID NO: 6; and a light chain variable region comprising light chain complementarity determining region 1 (LCDR1) comprising the amino acid sequence of SEQ ID NO: 7, light chain complementarity determining region 2 (LCDR2) comprising the amino acid sequence of SEQ ID NO: 8, and light chain complementarity determining region 3 (LCDR3) comprising the amino acid sequence of SEQ ID NO: 9.

2. The antibody or antigen-binding fragment thereof of claim 1, wherein the epitope comprises the amino acid sequence of SEQ ID NO: 3.

3. The antibody or antigen-binding fragment thereof of claim 1, wherein the antibody or antigen-binding fragment thereof comprises an scFv fragment, an scFv-Fc fragment, a Fab fragment, an Fv fragment, a diabody, a chimeric antibody, a mouse antibody, a goat antibody, a sheep antibody, a marmot antibody, a rat antibody, a rabbit antibody, or a humanized antibody.

4. A composition for detection of NT-proBNP, comprising the antibody or antigen-binding fragment thereof of claim 1 and a second antibody or antigen-binding fragment thereof, which binds specifically to NT-proBNP comprising the amino acid sequence of SEQ ID NO: 1.

5. A kit for detection of NT-proBNP, comprising the antibody or antigen-binding fragment thereof of claim 1 and a second antibody or antigen-binding fragment thereof, which binds specifically to NT-proBNP comprising the amino acid sequence of SEQ ID NO: 1, wherein the antibody or antigen-binding fragment thereof of claim 1 is a capture antibody, and the second antibody or antigen-binding fragment thereof is a detector antibody.

6. An antibody or antigen-binding fragment thereof, which binds specifically to N-terminal pro-B-type natriuretic peptide (NT-proBNP), the antibody or antigen-binding fragment thereof comprising:

a heavy chain variable region comprising heavy chain complementarity determining region 1 (HCDR1) comprising the amino acid sequence of SEQ ID NO: 4, heavy chain complementarity determining region 2 (HCDR2) comprising the amino acid sequence of SEQ ID NO: 5, and heavy chain complementarity determining region 3 (HCDR3) comprising the amino acid sequence of SEQ ID NO: 6; and a light chain variable region comprising light chain complementarity determining region 1 (LCDR1) comprising the amino acid sequence of SEQ ID NO: 7, light chain complementarity determining region 2 (LCDR2) comprising the amino acid sequence of SEQ ID NO: 8, and light chain complementarity determining region 3 (LCDR3) comprising the amino acid sequence of SEQ ID NO: 9.

7. A method of detecting N-terminal pro-B-type natriuretic peptide (NT-proBNP), the method comprising:

contacting, with a biological sample isolated from a subject, an antibody or antigen-binding fragment thereof, which specifically binds to an epitope of NT-proBNP comprising the amino acid sequence of HXLGXXX; and detecting a complex formed by binding of the antibody or antigen-binding fragment thereof to the biological sample, wherein the antibody or antigen-binding fragment thereof comprises:

a heavy chain variable region comprising heavy chain complementarity determining region 1 (HCDR1) comprising the amino acid sequence of SEQ ID NO: 4, heavy chain complementarity determining region 2 (HCDR2) comprising the amino acid sequence of SEQ ID NO: 5, and heavy chain complementarity determining region 3 (HCDR3) comprising the amino acid sequence of SEQ ID NO: 6; and a light chain variable region comprising light chain complementarity determining region 1 (LCDR1) comprising the amino acid sequence of SEQ ID NO: 7, light chain complementarity determining region 2 (LCDR2) comprising the amino acid sequence of SEQ ID NO: 8, and light chain complementarity determining region 3 (LCDR3) comprising the amino acid sequence of SEQ ID NO: 9.

8. The method of claim 7, wherein the contacting further comprises contacting, with the biological sample isolated from a subject, a second antibody or antigen-binding fragment thereof, which binds specifically to NT-proBNP comprising the amino acid sequence of SEQ ID NO: 1.

* * * * *

SEQUENCE LISTING

```
Sequence total quantity: 38
SEQ ID NO: 1            moltype = AA  length = 85
FEATURE                 Location/Qualifiers
source                  1..85
                        mol_type = protein
                        organism = synthetic construct
SEQUENCE: 1
HPLGGRSPAS EASEASEASG LWAVQELLGR LKDAVSELQA EQLALEPLHR SHSPAEAPEA  60
GGTPRGVLAP HDSVLQALRR LRSPK                                        85

SEQ ID NO: 2            moltype =   length =
SEQUENCE: 2
000

SEQ ID NO: 3            moltype = AA  length = 7
FEATURE                 Location/Qualifiers
source                  1..7
                        mol_type = protein
                        organism = synthetic construct
SEQUENCE: 3
HPLGGRS                                                            7

SEQ ID NO: 4            moltype = AA  length = 9
FEATURE                 Location/Qualifiers
source                  1..9
                        mol_type = protein
                        organism = synthetic construct
SEQUENCE: 4
GFSLSTSGV                                                          9

SEQ ID NO: 5            moltype = AA  length = 5
FEATURE                 Location/Qualifiers
source                  1..5
                        mol_type = protein
                        organism = synthetic construct
SEQUENCE: 5
WWDDD                                                              5

SEQ ID NO: 6            moltype = AA  length = 10
FEATURE                 Location/Qualifiers
source                  1..10
                        mol_type = protein
                        organism = synthetic construct
SEQUENCE: 6
MDDYNYAFDY                                                         10

SEQ ID NO: 7            moltype = AA  length = 16
FEATURE                 Location/Qualifiers
source                  1..16
                        mol_type = protein
                        organism = synthetic construct
SEQUENCE: 7
KSSQSLLYSN GKTYLN                                                  16

SEQ ID NO: 8            moltype = AA  length = 7
FEATURE                 Location/Qualifiers
source                  1..7
                        mol_type = protein
```

```
                        organism = synthetic construct
SEQUENCE: 8
LVSKLDS                                                                       7

SEQ ID NO: 9            moltype = AA  length = 9
FEATURE                 Location/Qualifiers
source                  1..9
                        mol_type = protein
                        organism = synthetic construct
SEQUENCE: 9
VQGTHFPLT                                                                     9

SEQ ID NO: 10           moltype = AA  length = 15
FEATURE                 Location/Qualifiers
source                  1..15
                        mol_type = protein
                        organism = synthetic construct
SEQUENCE: 10
HPLGGRSPAS EASEA                                                              15

SEQ ID NO: 11           moltype = AA  length = 15
FEATURE                 Location/Qualifiers
source                  1..15
                        mol_type = protein
                        organism = synthetic construct
SEQUENCE: 11
RSPASEASEA SEASG                                                              15

SEQ ID NO: 12           moltype = AA  length = 15
FEATURE                 Location/Qualifiers
source                  1..15
                        mol_type = protein
                        organism = synthetic construct
SEQUENCE: 12
EASEASEASG LWAVQ                                                              15

SEQ ID NO: 13           moltype = AA  length = 15
FEATURE                 Location/Qualifiers
source                  1..15
                        mol_type = protein
                        organism = synthetic construct
SEQUENCE: 13
SEASGLWAVQ ELLGR                                                              15

SEQ ID NO: 14           moltype = AA  length = 15
FEATURE                 Location/Qualifiers
source                  1..15
                        mol_type = protein
                        organism = synthetic construct
SEQUENCE: 14
LWAVQELLGR LKDAV                                                              15

SEQ ID NO: 15           moltype = AA  length = 15
FEATURE                 Location/Qualifiers
source                  1..15
                        mol_type = protein
                        organism = synthetic construct
SEQUENCE: 15
ELLGRLKDAV SELQA                                                              15

SEQ ID NO: 16           moltype = AA  length = 15
FEATURE                 Location/Qualifiers
source                  1..15
                        mol_type = protein
                        organism = synthetic construct
SEQUENCE: 16
LKDAVSELQA EQLAL                                                              15

SEQ ID NO: 17           moltype = AA  length = 15
FEATURE                 Location/Qualifiers
source                  1..15
                        mol_type = protein
                        organism = synthetic construct
SEQUENCE: 17
SELQAEQLAL EPLHR                                                              15

SEQ ID NO: 18           moltype = AA  length = 15
FEATURE                 Location/Qualifiers
source                  1..15
```

```
                        mol_type = protein
                        organism = synthetic construct
SEQUENCE: 18
EQLALEPLHR SHSPA                                                     15

SEQ ID NO: 19           moltype = AA  length = 15
FEATURE                 Location/Qualifiers
source                  1..15
                        mol_type = protein
                        organism = synthetic construct
SEQUENCE: 19
EPLHRSHSPA EAPEA                                                     15

SEQ ID NO: 20           moltype = AA  length = 15
FEATURE                 Location/Qualifiers
source                  1..15
                        mol_type = protein
                        organism = synthetic construct
SEQUENCE: 20
SHSPAEAPEA GGTPR                                                     15

SEQ ID NO: 21           moltype = AA  length = 15
FEATURE                 Location/Qualifiers
source                  1..15
                        mol_type = protein
                        organism = synthetic construct
SEQUENCE: 21
EAPEAGGTPR GVLAP                                                     15

SEQ ID NO: 22           moltype = AA  length = 15
FEATURE                 Location/Qualifiers
source                  1..15
                        mol_type = protein
                        organism = synthetic construct
SEQUENCE: 22
GGTPRGVLAP HDSVL                                                     15

SEQ ID NO: 23           moltype = AA  length = 15
FEATURE                 Location/Qualifiers
source                  1..15
                        mol_type = protein
                        organism = synthetic construct
SEQUENCE: 23
GVLAPHDSVL QALRR                                                     15

SEQ ID NO: 24           moltype = AA  length = 15
FEATURE                 Location/Qualifiers
source                  1..15
                        mol_type = protein
                        organism = synthetic construct
SEQUENCE: 24
HDSVLQALLR LRSPK                                                     15

SEQ ID NO: 25           moltype = AA  length = 13
FEATURE                 Location/Qualifiers
source                  1..13
                        mol_type = protein
                        organism = synthetic construct
SEQUENCE: 25
HPLGGRSPAS EAS                                                       13

SEQ ID NO: 26           moltype = AA  length = 11
FEATURE                 Location/Qualifiers
source                  1..11
                        mol_type = protein
                        organism = synthetic construct
SEQUENCE: 26
HPLGGRSPAS E                                                         11

SEQ ID NO: 27           moltype = AA  length = 9
FEATURE                 Location/Qualifiers
source                  1..9
                        mol_type = protein
                        organism = synthetic construct
SEQUENCE: 27
HPLGGRSPA                                                            9

SEQ ID NO: 28           moltype = AA  length = 4
FEATURE                 Location/Qualifiers
```

```
source                  1..4
                        mol_type = protein
                        organism = synthetic construct
SEQUENCE: 28
HPLG                                                                        4

SEQ ID NO: 29           moltype = AA  length = 6
FEATURE                 Location/Qualifiers
source                  1..6
                        mol_type = protein
                        organism = synthetic construct
SEQUENCE: 29
HPLGGR                                                                      6

SEQ ID NO: 30           moltype = AA  length = 5
FEATURE                 Location/Qualifiers
source                  1..5
                        mol_type = protein
                        organism = synthetic construct
SEQUENCE: 30
HPLGG                                                                       5

SEQ ID NO: 31           moltype = AA  length = 85
FEATURE                 Location/Qualifiers
source                  1..85
                        mol_type = protein
                        organism = synthetic construct
SEQUENCE: 31
APLGGRSPAS EASEASEASG LWAVQELLGR LKDAVSELQA EQLALEPLHR SHSPAEAPEA  60
GGTPRGVLAP HDSVLQALRR LRSPK                                         85

SEQ ID NO: 32           moltype = AA  length = 85
FEATURE                 Location/Qualifiers
source                  1..85
                        mol_type = protein
                        organism = synthetic construct
SEQUENCE: 32
HALGGRSPAS EASEASEASG LWAVQELLGR LKDAVSELQA EQLALEPLHR SHSPAEAPEA  60
GGTPRGVLAP HDSVLQALRR LRSPK                                         85

SEQ ID NO: 33           moltype = AA  length = 85
FEATURE                 Location/Qualifiers
source                  1..85
                        mol_type = protein
                        organism = synthetic construct
SEQUENCE: 33
HPAGGRSPAS EASEASEASG LWAVQELLGR LKDAVSELQA EQLALEPLHR SHSPAEAPEA  60
GGTPRGVLAP HDSVLQALRR LRSPK                                         85

SEQ ID NO: 34           moltype = AA  length = 85
FEATURE                 Location/Qualifiers
source                  1..85
                        mol_type = protein
                        organism = synthetic construct
SEQUENCE: 34
HPLAGRSPAS EASEASEASG LWAVQELLGR LKDAVSELQA EQLALEPLHR SHSPAEAPEA  60
GGTPRGVLAP HDSVLQALRR LRSPK                                         85

SEQ ID NO: 35           moltype = AA  length = 85
FEATURE                 Location/Qualifiers
source                  1..85
                        mol_type = protein
                        organism = synthetic construct
SEQUENCE: 35
HPLGARSPAS EASEASEASG LWAVQELLGR LKDAVSELQA EQLALEPLHR SHSPAEAPEA  60
GGTPRGVLAP HDSVLQALRR LRSPK                                         85

SEQ ID NO: 36           moltype = AA  length = 85
FEATURE                 Location/Qualifiers
source                  1..85
                        mol_type = protein
                        organism = synthetic construct
SEQUENCE: 36
HPLGGASPAS EASEASEASG LWAVQELLGR LKDAVSELQA EQLALEPLHR SHSPAEAPEA  60
GGTPRGVLAP HDSVLQALRR LRSPK                                         85

SEQ ID NO: 37           moltype = AA  length = 85
FEATURE                 Location/Qualifiers
source                  1..85
```

-continued

```
                        mol_type = protein
                        organism = synthetic construct
SEQUENCE: 37
HPLGGRAPAS EASEASEASG LWAVQELLGR LKDAVSELQA EQLALEPLHR SHSPAEAPEA  60
GGTPRGVLAP HDSVLQALRR LRSPK                                        85

SEQ ID NO: 38           moltype = AA  length = 85
FEATURE                 Location/Qualifiers
source                  1..85
                        mol_type = protein
                        organism = synthetic construct
SEQUENCE: 38
HPLGGRSAAS EASEASEASG LWAVQELLGR LKDAVSELQA EQLALEPLHR SHSPAEAPEA  60
GGTPRGVLAP HDSVLQALRR LRSPK                                        85
```